United States Patent [19]
Juntgen et al.

[11] 3,888,958
[45] June 10, 1975

[54] PROCESS FOR MAKING SHAPED PIECES FROM LOW TEMPERATURE COKE OF LOW BULK WEIGHT

[75] Inventors: Harald Juntgen; Karl Knoblauch; Dieter Zündorf, all of Essen, Germany

[73] Assignee: Bergwerksverband GmbH, Essen, Germany

[22] Filed: Jan. 24, 1973

[21] Appl. No.: 326,288

Related U.S. Application Data
[63] Continuation-in-part of Ser. No. 125,745, March 18, 1971, abandoned.

[30] Foreign Application Priority Data
Mar. 21, 1970  Germany............................ 2013604

[52] U.S. Cl.......... 264/29; 264/176 R; 264/DIG. 19; 423/448; 423/449
[51] Int. Cl.............................................. B29c 25/00
[58] Field of Search.............. 264/29, 66, 99, 176 R, 264/DIG. 19; 423/445, 448, 449

[56] References Cited
UNITED STATES PATENTS

| | | | |
|---|---|---|---|
| 3,010,882 | 11/1961 | Barclay et al. | 264/29 |
| 3,280,231 | 10/1966 | Bentolilla et al. | 264/29 |
| 3,370,113 | 2/1968 | Goeddel | 264/29 |
| 3,392,216 | 7/1968 | Otani et al. | 264/83 |
| 3,444,276 | 5/1969 | Olstowski et al. | 264/29 |
| 3,533,741 | 10/1970 | Higgins | 264/DIG. 19 |
| 3,558,276 | 1/1971 | Otani | 264/29 |
| 3,619,376 | 11/1971 | Patel et al. | 264/29 |
| 3,639,953 | 2/1972 | Kimura et al. | 264/171 |
| 3,666,847 | 5/1972 | Bailey | 264/29 |

*Primary Examiner*—Jay H. Woo
*Attorney, Agent, or Firm*—Allison C. Collard

[57] ABSTRACT

A carbonaceous body of low bulk weight, suitable for the manufacture of activated carbon, is prepared by forming a plastic mixture of a powdered carbonaceous material with a liquid binder such as pitch or tar, heating the mixture at a temperature between about 50° and about 90°C and forming it into a cylindrical body, introducing the body into a heating zone and heating it at a rate between about 20° and about 70°C per minute to a temperature between about 300° and about 450°C with substantial exclusion of air, further heating the body at a rate of about 50° to about 500°C per minute, with limited admission of air, to a final temperature between about 600° and about 900°C and maintaining it at that temperature until the body is substantially completely carbonized. The shaped bodies may have a length of about 1–10 mm, have very high absorptive capacity, and are useful for purposes of filtration and absorption, as well as making activated carbon.

4 Claims, 2 Drawing Figures

PATENTED JUN 10 1975  3,888,958

3,888,958

PROCESS FOR MAKING SHAPED PIECES FROM LOW TEMPERATURE COKE OF LOW BULK WEIGHT

CROSS-REFERENCE TO RELATED APPLICATION

This application is a continuation-in-part of application Ser. No. 125,745, filed Mar. 18, 1971, now abandoned.

BACKGROUND OF THE INVENTION

The present invention relates to low temperature coke of low bulk weight and indirectly also relates to the making of activated carbon therefrom. The invention also is concerned with a process of making low temperature coke and similar carbonaceous materials having very high absorptive capacity, which are useful for purposes of filtration and absorption, as well as for the manufacture of activated carbon.

Low temperature cokes are materials which are suited in certain cases for purposes of filtration and absorption; they are also in great demand as a starting product for the production of activated carbon made by gas activation, and particularly steam activation. These cokes are made by burning granular carbonaceous materials at low temperatures, often with limited access of air. When materials in powder form are used as starting materials, the fine particles are first shaped, for instance by mixing them with pitch, tar and similar products, and then made into briquettes.

SUMMARY OF THE INVENTION

In accordance with the present invention, there is provided a process for the manufacture of a carbonaceous body of the low temperature coke type having low bulk weight comprising the steps of:

a. preparing a plastic mixture consisting essentially of a powdered source of carbon selected from the group consisting of anthracite, charcoal, oxidized coal, coke, peat and lignite, and a binder selected from the group consisting of hard pitch, soft pitch, tar and anthracene oil, the weight proportion of the binder to carbon material ranging from about 17.5 to about 28 percent, b. heating said mixture to a temperature between about 50° and about 95°C and forming the mixture into a cylindrical body;

c. introducing said formed body into a heating zone and heating it at a rate of between about 20°C and about 70°C per minute to a temperature to about 300° to about 450°C with exclusion of air;

d. further heating said body at a rate of about 50° to about 500°C per minute, with limited admission of air, to a final temperature between about 600°C and about 900°C and maintaining it at that temperature until the body is substantially completely carbonized.

DETAILED DESCRIPTION OF THE INVENTION

Figures 1, 2:
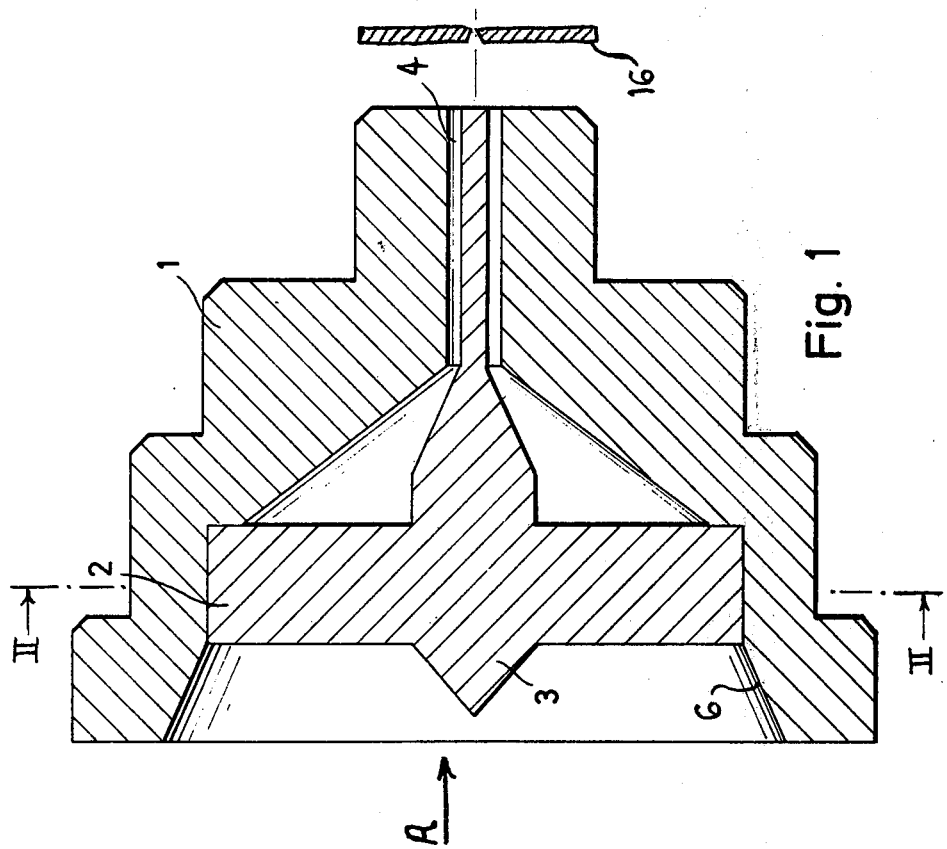

To make the plastic mixtures, different starting materials may be used, e.g., charcoal, peat, coke, oxidized coal, lignite, anthracite and other non-baking coals. As binders, hard pitch, soft pitch, tar or anthracene oil have been found suitable. The plastic mixtures are extruded in heated extruders in which the mixtures are conveyed, for example, by a screw or similar conveyor means into and through a channel, in which a central pin is mounted. Upon emerging from the extrusion channel, the formed rope is then cut into the desired lengths.

The practice of the invention will be more readily understood by reference to the accompanying drawing showing an extruder for carrying out the process according to the invention as shown schematically in its essential parts, in which FIG. 1 shows the device in section; and, FIG. 2 illustrates a part thereof in front sectional view, along the line II — II of FIG. 1.

Referring to FIG. 1, the extruder is generally designated by 1. The plastic mass arrives from a source (not shown) in the direction of arrow A and is fed by conveyor means (not shown) to a receiving port 6, where a pin 3 is centrally arranged. The pin is mounted in a ring-shaped holder 2 by a number of arms 5 forming compartments through which the mass is proceeding toward a channel 4, while being compressed. Below the channel exit, a knife 16 is mounted for rotation, which cuts the extruded rope into pieces of the desired length, e.g., 1–10 mm.

FIG. 2 shows the ring-holder 2 with a single pin 3, but it should be understood that one port may have mounted therein several pins, e.g., four, six or eight, with their associated extrusion channels.

It is surprising that the mixtures of carbonaceous materials and pitch or tar are capable of being extruded in accordance with the first stage of the process to form shaped bodies, since the mixtures are easily decomposed pyrolytically depending on the temperature range with change of their mechanical properties and/or loss of form stability. Maintaining the temperatures as indicated above is important for achieving the object of the invention in the first stage of the process.

It is a further important feature of the invention that the subsequent heating of the cylindrical bodies be carried out with low mechanical impact, since the formed bodies are in a soft state at temperatures between 300° and 450°C. However, surprisingly good yields of intact cylindrical shaped bodies are obtained when care is taken to observe the above directions and to carry out the step of further temperature treatment in tunnel ovens, particularly conveyor-or band-type ovens, continuous coking apparatus as described in U.S. Pat. No. 3,444,048, or other shaft furnaces which permit a careful transport of the materials.

Moreover, it is possible to use rotary kilns when smaller revolutions per minute of the kiln can be maintained and the rate at which the material is heated up can be adjusted to 50°C per minute, until the temperature range of 300°–450°C is passed. Afterwards, a higher rate of heating-up can be used from 50°–500°C per minute. With ovens or furnaces which make a mild treatment possible, the materials may be heated up at the higher rate from the start.

In view of the instability of the cylindrical formed bodies between the temperatures of 300° and 450°C, a two-stage process may be employed, wherein the process is carried out carefully in a conveyor- or band-type oven, continuous coking apparatus, or shaft furnace up to 450°C, and subsequently heated with limited admission of air slowly in any desired manner, even with considerable mechanical impact.

In preparing the mixture of carbonaceous starting material and binder, the range of weight proportion of binder to carbonaceous material will generally be between about 17.5 percent and about 28 percent.

In the preparation of the ring-shaped low temperature coke bodies, there is employed extrusion under pressure ranging from about 5 to about 100 atmospheres, using an apparatus of the type shown in the drawings. The speed with which the formed mass emerges from the mouth of the apparatus will ordinarily lie between about 0.2 and about 10 mm. per second.

The quantity of material extruded will depend upon the capacity of the apparatus. Ordinarily it will amount to from about 30 to about 1,000 kg. per hour.

As indicated previously, the second stage heating of the material takes place with substantial exclusion of air, and under ordinary industrial conditions. This means that the equipment is not, as a rule, completely air-tight, even though theoretically the oxygen supply could be zero.

In the final heating stage, the formed body is heated with limited admission or access of air. For the purposes of the invention, this is defined as providing an atmosphere in the heating zone in which the oxygen concentration is less than about 2 percent by volume.

The shaped bodies according to the invention may be made in practically any desired dimensions. Their length is in general 1–10 mm, their outer diameter 4–10 mm, and their wall thickness 2–4 mm. In any case, the mechanical strength of the slowly heated cylindrical bodies is so high that their subsequent gas activation may be carried out in any desired furnace, e.g., a rotary kiln or a turbulence chamber, the stability of the bodies being maintained when up to about 70 percent by weight have been lost by burning. This result is also surprising, because during gas activation, shrinkage of the formed bodies of 50 percent and more occurs, which leads to inner tensions so that cracking or tearing of the bodies was to be expected.

The process of the invention will now be more fully explained in a number of examples, which are given by way of illustration and not of limitation.

EXAMPLE 1

25 parts by weight of ground lean coal are thoroughly mixed with 7 parts by weight of tar at a temperature of 80°C. The mixture is then compressed in an extruder being equipped with four pins, to form cylindrical bodies which, after extrusion are introduced into a rotary kiln. The kiln has a diameter of about 600 mm, a rotational speed of 15 revolutions per hour, a filling height at the discharge end of about 20 cm, and a mean heating-up rate of 20°C/minute; the mass is slowly heated further at 750°C. The yield in undecomposed bodies of slowly heated coke amounts to 91.5 percent by weight. The so obtained coke is suitable for absorptions of streaming gases. The resistance to the current is very low with a batch 5 m high.

EXAMPLE 2

80 parts by weight of powdered charcoal are mixed with 20 parts by weight of soft pitch at 65°–70°C and shaped in an extruder into formed bodies of 8 mm length, 9 mm outer diameter, and 5 mm inner diameter. After having been heated up initially at a mean rate of 70°C/minute, in a conveyor-type oven, being then slowly heated to a temperature of 850°C, they are subsequently activated with steam in a turbulence chamber to a weight loss of 50 percent. The shaped bodies are separated from broken grains by screening. The yield of undestroyed shaped bodies is 93 percent.

The impact strength of the activated bodies is 80 percent. For the determination of the impact strength, 25 cc of activated carbon are pounded 10 times with a body weighing 327 g from a height of 48 cm, and the residue passed through a 0.5 screen and given in percent.

EXAMPLE 3

85 parts by weight of ground oxidized coal are mixed with 15 parts by weight of anthracene oil at 65°C and made into cylindrical bodies in an extruder. The shaping mold is provided with eight pins arranged in a circle and having extrusion channels associated therewith. Heating with limited access of air of the cylindrical bodies is performed in a shaft furnace up to 900°C, whereupon the obtained product is activated with steam to a weight loss of 45 percent. The yield of undestroyed cylindrical bodies of activated charcoal is 95.9 percent by weight, the impact strength of the bodies is 89.2 percent.

While only a few examples of the present invention have been shown and described, it is obvious that many changes and modifications can be made thereunto without departing from the spirit and scope of the invention.

What is claimed is:
1. Process for the manufacture of a ring-shaped carbonaceous body of low temperature coke type having high absorptive capacity and low bulk weight comprising the steps of:
   a. preparing a plastic mixture consisting essentially of a powdered source of carbon selected from the group consisting of anthracite, charcoal, oxidized coal, coke, peat and lignite, and a binder selected from the group consisting of hard pitch, soft pitch, tar and anthracene oil, the weight proportion of the binder to carbon material ranging from about 17.5 to about 28 percent,
   b. heating said mixture to a temperature between about 50°C and about 95°C and maintaining said mixture at that temperature for a sufficient time to attain an extrudable consistency and forming the mixture into a ring-shaped cylindrical body by extrusion under a pressure between about 5 and about 100 atmospheres,
   c. introducing said formed body into a heating zone and heating it at a rate between about 20°C and about 70°C per minute for a sufficient time to attain a temperature from about 300°C to about 450°C said body being in a soft state with substantial exclusion of outside air from the atmosphere in said heating zone, and
   d. further heating said body at a rate of about 50°C to about 500°C per minute, with limited admission of air, to a final temperature between about 600°C and to about 900°C and maintaining it at that temperature until the body is substantially completely carbonized.

2. The process according to claim 1, wherein the temperature in step (b) is between about 70° and about 80°C.

3. The process according to claim 1 wherein the length of the extruded bodies is between about 1 and about 10 mm.

4. The process according to claim 1 wherein the products obtained after final heating are subjected to an activation by gas or steam to obtain activated carbon.

* * * * *